(12) United States Patent
Hintz

(10) Patent No.: US 6,394,368 B1
(45) Date of Patent: May 28, 2002

(54) IRRIGATION EMITTER DEVICE

(76) Inventor: Coleen C. Hintz, 6016 N Tower La. Apt A, Prescott Valley, AZ (US) 86314

( * ) Notice: Subject to any disclaimer, the term of this patent is extended or adjusted under 35 U.S.C. 154(b) by 0 days.

(21) Appl. No.: 09/667,021

(22) Filed: Sep. 21, 2000

(51) Int. Cl.$^7$ .............................................. B05B 15/00
(52) U.S. Cl. ...................... 239/542; 239/267; 239/269; 239/276; 239/279; 239/547; 239/562; 137/883
(58) Field of Search ................................ 239/200, 266, 239/267, 268, 269, 273, 276, 279, 536, 542, 547, 548, 550, 562, 565, 551, 588, 275; 137/883; 47/48.5

(56) References Cited

U.S. PATENT DOCUMENTS

| | | | | |
|---|---|---|---|---|
| 986,003 | A | * | 3/1911 | Von Hohenstein ...... 239/276 X |
| 1,484,575 | A | * | 2/1924 | Shulin ......................... 239/542 |
| 2,598,961 | A | * | 6/1952 | Andrus ........................ 137/883 |
| 2,706,134 | A | * | 4/1955 | Wilson et al. ............... 239/269 |
| 2,755,985 | A | * | 7/1956 | Finegan ....................... 239/267 |
| 3,085,364 | A | | 4/1963 | Chapin |
| 3,199,791 | A | | 8/1965 | Chapin |
| 3,567,134 | A | | 3/1971 | Smith |
| 3,672,571 | A | | 6/1972 | Goodricke |
| 4,126,998 | A | | 11/1978 | Gilead |
| 4,153,380 | A | * | 5/1979 | Hartman ................... 47/48.5 X |
| 4,194,695 | A | | 3/1980 | Schopp |
| 4,753,394 | A | * | 6/1988 | Goodman ................... 239/542 |
| D303,913 | S | | 10/1989 | Leap |

* cited by examiner

Primary Examiner—Steven J. Ganey

(57) ABSTRACT

A irrigation emitter device for delivering water to various points along a length of a hose. The irrigation emitter device includes a primary hose. The primary hose is elongate and has a first end and a second end. Each of a plurality of secondary hoses has a first end and a second end. Each of the first ends of the secondary hoses is fluidly coupled to the primary hose. Each of the secondary hoses is spaced from each other and has a length less than a length of the primary hose. A valve means selectively opens and closes the second end of the primary hose. The valve means is securely attached to the second end of the first hose. The valve means coupled to the second end of the primary hose has a threaded inner surface and defines a female coupler. A male coupling member is securely attached to the first end of the primary hose such that a plurality of primary hoses may selectively be fluidly coupled together.

7 Claims, 3 Drawing Sheets

IRRIGATION EMITTER DEVICE

BACKGROUND OF THE INVENTION

1. Field of the Invention

The present invention relates to irrigation emitter devices and more particularly pertains to a new irrigation emitter device for delivering water to various points along a length of a hose.

2. Description of the Prior Art

The use of irrigation emitter devices is known in the prior art. More specifically, irrigation emitter devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,085,364; U.S. Pat. No. 4,194,695; U.S. Pat. No. 3,199,791; U.S. Pat. No. 4,126,998; Des. U.S. Pat. No. 303,913; U.S. Pat. No. 3,567,134; and U.S. Pat. No. 3,672,571.

While these devices fulfill their respective, particular objectives and requirements, the aforementioned patents do not disclose a new irrigation emitter device. The inventive device includes a primary hose. The primary hose is elongate and has a first end and a second end. Each of a plurality of secondary hoses has a first end and a second end. Each of the first ends of the secondary hoses is fluidly coupled to the primary hose. Each of the secondary hoses is spaced from each other and has a length less than a length of the primary hose. A valve means selectively opens and closes the second end of the primary hose. The valve means is securely attached to the second end of the first hose. The valve means coupled to the second end of the primary hose has a threaded inner surface and defines a female coupler. A male coupling member is securely attached to the first end of the primary hose such that a plurality of primary hoses may selectively be fluidly coupled together.

In these respects, the irrigation emitter device according to the present invention substantially departs from the conventional concepts and designs of the prior art, and in so doing provides an apparatus primarily developed for the purpose of delivering water to various points along a length of a hose.

SUMMARY OF THE INVENTION

In view of the foregoing disadvantages inherent in the known types of irrigation emitter devices now present in the prior art, the present invention provides a new irrigation emitter device construction wherein the same can be utilized for delivering water to various points along a length of a hose.

The general purpose of the present invention, which will be described subsequently in greater detail, is to provide a new irrigation emitter device apparatus and method which has many of the advantages of the irrigation emitter devices mentioned heretofore and many novel features that result in a new irrigation emitter device which is not anticipated, rendered obvious, suggested, or even implied by any of the prior art irrigation emitter devices, either alone or in any combination thereof.

To attain this, the present invention generally comprises a primary hose. The primary hose is elongate and has a first end and a second end. Each of a plurality of secondary hoses has a first end and a second end. Each of the first ends of the secondary hoses is fluidly coupled to the primary hose. Each of the secondary hoses is spaced from each other and has a length less than a length of the primary hose. A valve means selectively opens and closes the second end of the primary hose. The valve means is securely attached to the second end of the first hose. The valve means coupled to the second end of the primary hose has a threaded inner surface and defines a female coupler. A male coupling member is securely attached to the first end of the primary hose such that a plurality of primary hoses may selectively be fluidly coupled together.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new irrigation emitter device apparatus and method which has many of the advantages of the irrigation emitter devices mentioned heretofore and many novel features that result in a new irrigation emitter device which is not anticipated, rendered obvious, suggested, or even implied by any of the prior art irrigation emitter devices, either alone or in any combination thereof.

It is another object of the present invention to provide a new irrigation emitter device which may be easily and efficiently manufactured and marketed.

It is a further object of the present invention to provide a new irrigation emitter device which is of a durable and reliable construction.

An even further object of the present invention is to provide a new irrigation emitter device which is susceptible of a low cost of manufacture with regard to both materials and labor, and which accordingly is then susceptible of low prices of sale to the consuming public, thereby making such irrigation emitter device economically available to the buying public.

Still yet another object of the present invention is to provide a new irrigation emitter device which provides in the apparatuses and methods of the prior art some of the advantages thereof, while simultaneously overcoming some of the disadvantages normally associated therewith.

Still another object of the present invention is to provide a new irrigation emitter device for delivering water to various points along a length of a hose.

Yet another object of the present invention is to provide a new irrigation emitter device which includes a primary hose. The primary hose is elongate and has a first end and a second end. Each of a plurality of secondary hoses has a first end and a second end. Each of the first ends of the secondary hoses is fluidly coupled to the primary hose. Each of the secondary hoses is spaced from each other and has a length less than a length of the primary hose. A valve means selectively opens and closes the second end of the primary hose. The valve means is securely attached to the second end of the first hose. The valve means coupled to the second end of the primary hose has a threaded inner surface and defines a female coupler. A male coupling member is securely attached to the first end of the primary hose such that a plurality of primary hoses may selectively be fluidly coupled together.

Still yet another object of the present invention is to provide a new irrigation emitter device that may be used to water along the entire length of a hose.

Even still another object of the present invention is to provide a new irrigation emitter device that has secondary hoses each having a valve means thereon for closing the second ends of the secondary hoses.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
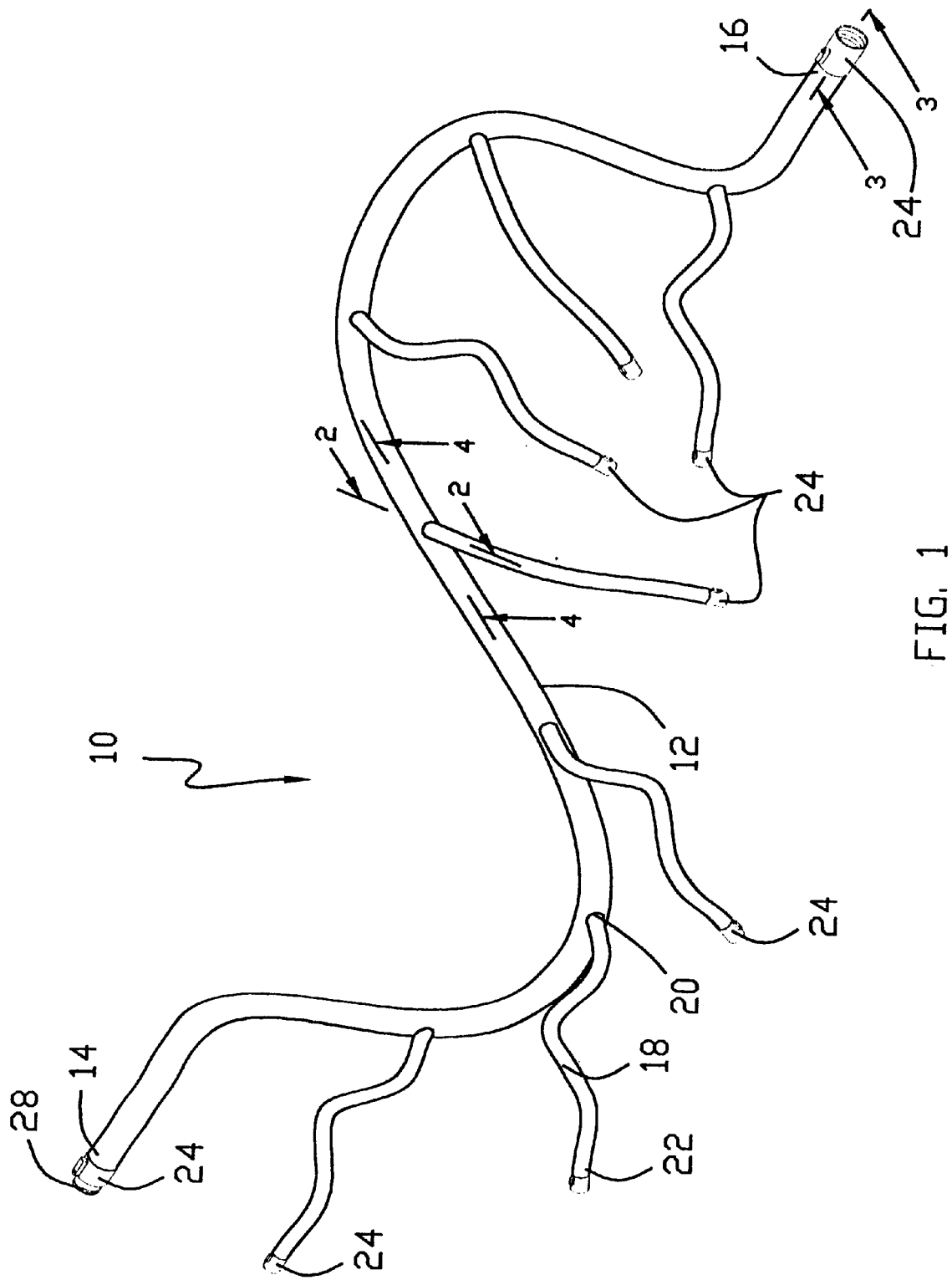
FIG. 1 is a schematic perspective view of a new irrigation emitter device according to the present invention.
Figure 2:
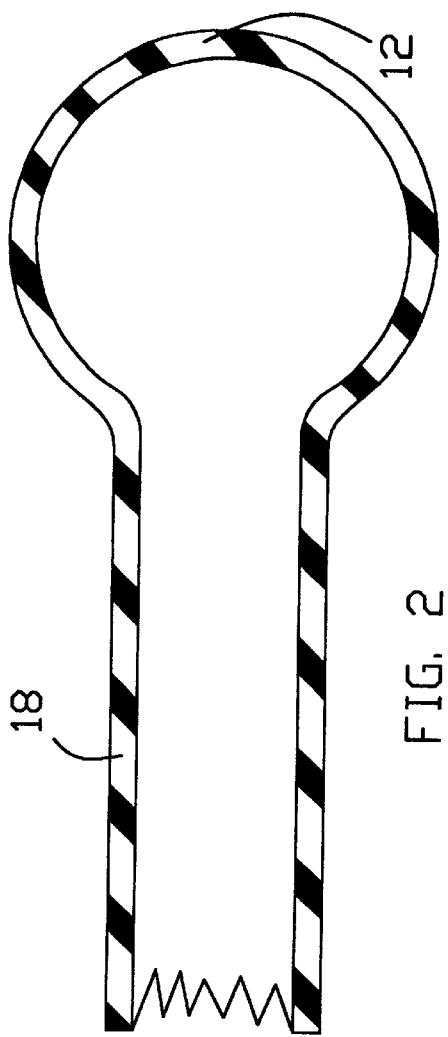
FIG. 2 is a schematic cross-sectional view taken along line 2—2 of the present invention.
Figure 3:
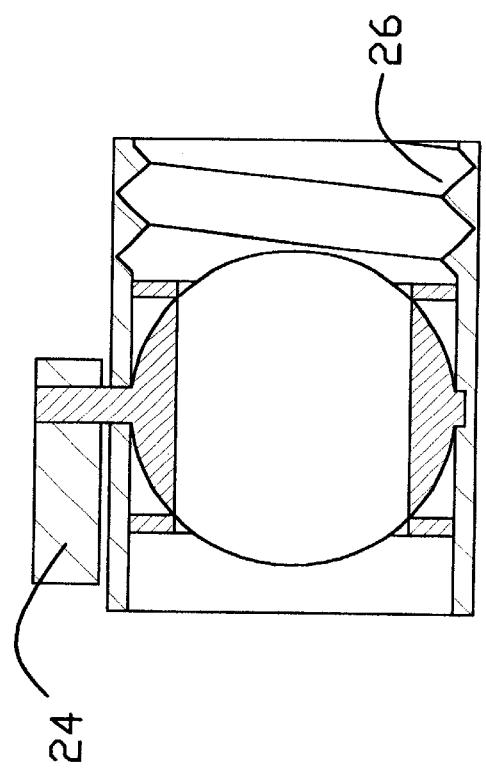
FIG. 3 is a schematic cross-sectional view taken along line 3—3 of the present invention.
Figure 4:
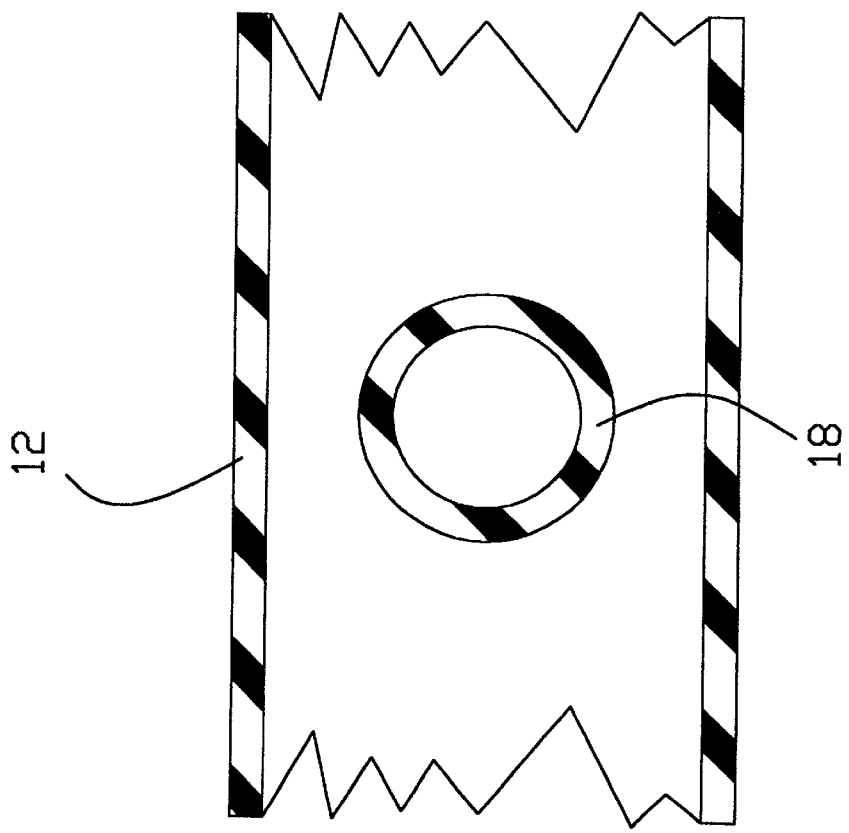
FIG. 4 is a schematic cross-sectional view taken along line 4—4 of the present invention.

With reference now to the drawings, and in particular to FIGS. 1 through 4 thereof, a new irrigation emitter device embodying the principles and concepts of the present invention and generally designated by the reference numeral 10 will be described.

As best illustrated in FIGS. 1 through 4, the irrigation emitter device 10 generally comprises a primary hose 12.

The primary hose 12 is elongate and has a first end 14 and a second end 16. The primary hose 12 preferably has a length generally between 24 feet and 30 feet.

Each of a plurality of secondary hoses 18 has a first end 20 and a second end 22. Each of the first ends 20 of the secondary hoses is fluidly coupled to the primary hose 12. Each of the secondary hoses 18 is spaced from each other such that each of the secondary hoses is preferably 3 feet from each other. Preferably each of the secondary hoses 18 has a length generally between 2 feet and 4 feet, and ideally each is 3 feet long. Ideally, the plurality of secondary hoses is seven secondary hoses.

A plurality of valve means 24 selectively open and close each of the primary 12 and secondary 18 hoses. Each of the valve means 24 comprises a conventional valve, and each is securely attached to each of the second ends 16, 22 of the first 12 and secondary 18 hoses. The valve means 24 coupled to the second end 16 of the primary hose 12 has a threaded inner surface 26 and defines a female coupler.

A male coupling member is securely attached to the first end 14 of the primary hose 12. The male coupling member is adapted for coupling with the female coupler such that that a plurality of primary hoses 12 may selectively be fluidly coupled together. Ideally, a valve means 24 is coupled to the second end of the primary hose and has an outer threaded surface 28 to define the male coupling member.

In use, the device is used as a conventional garden hose with the advantage of multiple hoses for directing water in various directions. The secondary hoses may be shut off when they are not needed.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An irrigation emitter device for distributing fluid in multiple directions, said device comprising:

a primary hose, said primary hose being elongate and having a first end and a second end;

a plurality of secondary hoses, each of said secondary hoses having a first end and a second end, each of said first ends of said secondary hoses being fluidly coupled to said primary hose, each of said secondary hoses being spaced from each other, each of said secondary hoses having a length less than a length of said primary hose;

a valve means for selectively opening and closing said second end of said primary hose, said valve means being securely attached to said second end of said primary hose, said valve means having a threaded inner surface and defining a female coupler;

a male coupling member being securely attached to said first end of said primary hose such that a plurality of primary hoses may selectively be fluidly coupled together; and a plurality of valve means for selectively opening and closing each of said secondary hoses, each of said plurality of valve means being securely attached to each of said second ends of said secondary hoses.

2. The irrigation emitter device as in claim 1, wherein each of said secondary hoses further comprise:

each of said secondary hoses being spaced from each other such that each of said secondary hoses is generally 3 feet from each other.

3. The irrigation emitter device as in claim 1, wherein each of said secondary hoses further comprise:

each of said secondary hoses having a length generally between 2 feet and 4 feet.

4. An irrigation emitter device for distributing fluid in multiple directions, said device comprising:

a primary hose, said primary hose being elongate and having a first end and a second end, said primary hose having a length generally between 24 feet and 30 feet;

a plurality of secondary hoses, each of said secondary hoses having a first end and a second end, each of said first ends of said secondary hoses being fluidly coupled to said primary hose, each of said secondary hoses being spaced from each other such that each of said secondary hoses is generally 3 feet from each other, each of said secondary hoses having a length generally between 2 feet and 4 feet, said plurality of secondary hoses being seven secondary hoses;

a plurality of valve means for selectively opening and closing said primary hose and each of said secondary hoses, each of said valve means being securely attached to said second end of said primary hose and each of said second ends of said secondary hoses, each of said valve means having a threaded inner surface and each defining a female coupler; and a male coupling member being securely attached to said first end of said primary hose such that a plurality of primary hoses may selectively be fluidly coupled together.

5. An irrigation emitter device for distributing fluid in multiple directions, said device comprising:

a primary hose, said primary hose being elongate and having a first end and a second end;

a plurality of secondary hoses, each of said secondary hoses having a first end and a second end, each of said first ends of said secondary hoses being fluidly coupled to said primary hose;

a plurality of valve means for selectively opening and closing said primary hose and each of said secondary hoses, each of said valve means being securely attached to said second end of said primary hose and each of said second ends of said secondary hoses, each of said valve means having a threaded inner surface and each defining a female coupler; and a male coupling member being securely attached to said first end of said primary hose such that a plurality of primary hoses may selectively be fluidly coupled together.

6. The irrigation emitter device as in claim 5, wherein each of said secondary hoses are spaced from each other such that each of said secondary hoses is generally 3 feet from each other.

7. The irrigation emitter device as in claim 5, wherein said primary hose and each of said secondary hoses are flexible.

* * * * *